United States Patent [19]
Alexander

[11] Patent Number: 6,125,491
[45] Date of Patent: Oct. 3, 2000

[54] COUNTERBALANCE FOR MECHANICAL DOCK LEVELER

[75] Inventor: James C. Alexander, London, Canada

[73] Assignee: United Dominion Industries, Inc., Charlotte, N.C.

[21] Appl. No.: 09/157,565

[22] Filed: Sep. 21, 1998

[51] Int. Cl.[7] .................................................. E01D 1/00
[52] U.S. Cl. ........................................... 14/69.5; 14/71.1
[58] Field of Search ..................... 14/69.5, 71.1, 14/71.3, 71.5, 71.7

[56] References Cited

U.S. PATENT DOCUMENTS

| | | | |
|---|---|---|---|
| 3,117,332 | 1/1964 | Kelley et al. | |
| 3,137,876 | 6/1964 | Loomis | 14/71.3 |
| 3,327,335 | 6/1967 | Beckwith et al. | 14/71.3 |
| 3,409,922 | 11/1968 | Beckwith et al. | 14/71.3 |
| 3,486,181 | 12/1969 | Hecker, Jr. et al. | 14/71.3 |
| 3,500,486 | 3/1970 | LeClear | 14/71.3 |
| 3,528,118 | 9/1970 | Smith | 14/71.3 |
| 3,671,990 | 6/1972 | Hovestad | 14/71.3 |
| 3,699,601 | 10/1972 | Hecker, Jr. et al. | 14/71.3 |
| 3,882,563 | 5/1975 | Smith et al. | 14/71.3 |
| 4,126,909 | 11/1978 | Smith et al. | 14/71.3 |
| 4,257,136 | 3/1981 | Loblock | 14/71.3 |
| 4,525,887 | 7/1985 | Erlandsson et al. | 14/71.3 |
| 4,531,248 | 7/1985 | Swessel et al. | 14/71.3 |
| 4,689,846 | 9/1987 | Sherrod | 14/71.3 |
| 5,123,135 | 6/1992 | Cook et al. | 14/71.3 |
| 5,784,740 | 7/1998 | DiSieno et al. | 14/71.3 |

FOREIGN PATENT DOCUMENTS

502763A1  2/1992  European Pat. Off. ............... 14/71.3

*Primary Examiner*—Robert E. Pezzuto
*Assistant Examiner*—Kristine M. Markovich
*Attorney, Agent, or Firm*—Sughrue, Mion, Zinn, Macpeak & Seas, PLLC

[57] ABSTRACT

A dock leveler has a deck pivotally mounted to a frame. A counterbalance mechanism uses a pair of pivoting links connected together at a common point with a tension spring that is coupled at the other end to the deck. The links together with the frame and the deck form a four-bar linkage biased by the spring to counterbalance the weight of the deck.

16 Claims, 2 Drawing Sheets

COUNTERBALANCE FOR MECHANICAL DOCK LEVELER

BACKGROUND OF THE INVENTION

1. Field of the Invention.

This invention relates to dock loading equipment and in particular to dock levelers which are used to bridge the gap between a dock floor and a vehicle parked at the dock. It specifically relates to a counterbalance mechanism for a mechanical dock leveler.

2. Prior Art.

Mechanical dock levelers are typically mounted in a pit at a loading dock and use a frame as a supporting structure. The leveler has a deck pivotally mounted to the frame at one end a hinged lip mounted to the deck at the other end. The lip stores in a pendent position and is raised to rest on the bed of the vehicle thus bridging the gap that exists.

Mechanical dock levelers are typically upward biased, meaning that when the leveler is released the deck rises and the lip, via a mechanism, extends. The deck is then "walked down" until the lip rests on the truck bed. Generally a hold down mechanism is used to retain the deck in any position within the operative range of the leveler and when released the deck elevates. These devices employ counterbalance mechanisms, typically with extension springs.

U.S. Pat. No. 3,117,332 describes such a counterbalance mechanism with extension springs coupled to the deck at one end while another end of the springs is coupled to an arm that pivots relative to the frame. The arm carries a roller that rides on a cam surface to provide the necessary counterbalance force. This complex arrangement requires a central frame structure to support the roller arm pivot which adds cost and limits access for cleaning debris from the pit floor. Also, the spring adjustment bolt is at the back of the leveler which makes adjustment difficult. Additionally considerations of wear and maintenance exist for such arrangements.

A variation is the use of compression springs to provide the necessary counterbalancing force. U.S. Pat. No. 3,528,118 illustrates such an arrangement. A compression spring is mounted to the frame at one end and to a crank arm in turn connected to the deck. The spring thus acts through a crank arm reducing the efficiency of the device. The tube which guides the spring adds cost, causes frictional losses, and limits access for cleaning debris from the pit floor.

U.S. Pat. No. 4,525,887 describes the use of extension springs in combination with a linkage pivotally coupled to the frame and the deck. The links are pivotally connected to each other and the extension spring is connected to one of the links and the frame. The spring, acting at full efficiency may be smaller than those used in a compression mode. The linkage is designed so that the counterbalance force is slightly greater than the force of the deck thereby allowing the use of a smaller spring. This device however requires additional pivot points, increased friction in operation and higher manufacturing costs.

SUMMARY OF INVENTION

Given the shortcomings of the prior art, it is therefore an object of this invention to provide an improved counterbalance mechanism for a mechanical dock leveler.

It a further object of this invention to provide a reliable yet inexpensive counterbalance mechanism that reduces friction and the force needed to walk down the deck.

Yet another object of this invention is to provide a counterbalance mechanism that is simple to adjust yet easy to assemble and maintain.

In accordance with this invention the counterbalance uses a four bar mechanism together with pivot pins having rolling contact to reduce friction.

The new counterbalance mechanism of this invention has a lower link and upper link pivotally connected with a pivot pin. The lower link bears on a pin attached to the leveler frame and the upper link bears on a pin attached to the leveler deck. Multiple tension springs are attached to the deck and to a mounting bar which has an adjustment bolt which passes through the pivot pin. This configuration provides a single point of adjustment for lower cost and ease of assembly and maintenance. The pin attached to the leveler frame is located near the rear of the leveler so that when the leveler is raised, most of the pit floor is exposed for easy removal of debris from the pit.

All attachment pins have rolling contact (not sliding on the pivot pin) to reduce friction. The upper link also has rolling contact at the connecting pin. The lower link has conventional pivoting motion at the connecting pin, but the relative angle of rotation is significantly less than that of the other pivots so there is little frictional loss. The mechanism will work with conventional pivot pins connecting the links to the deck and the frame, but conventional pivot pins have sliding movement between the surfaces of the pin and the hole in the link. The rolling contact of this mechanism reduces friction and thus reduces the force required to operate the dock leveler.

This invention will be described by reference to the drawing and the description of the preferred embodiment that follows.

DESCRIPTION OF THE PREFERRED EMBODIMENT

Figure 1:
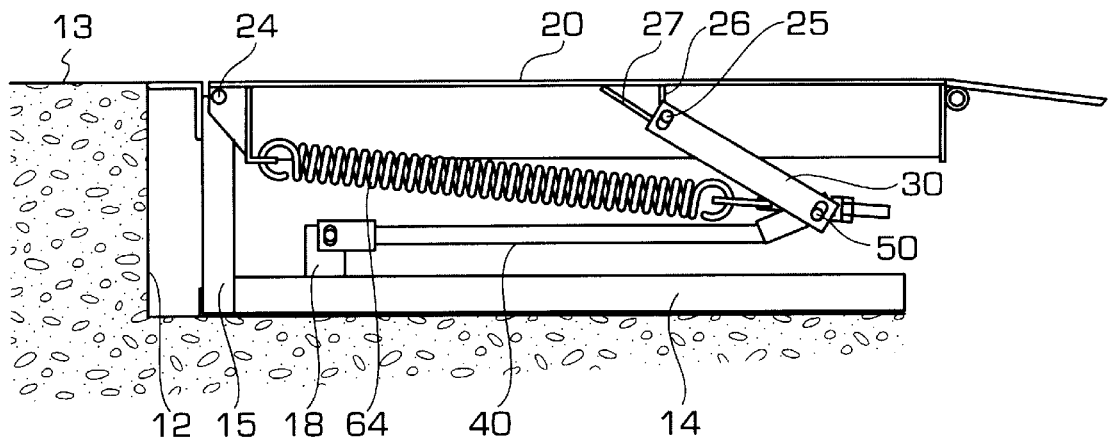
FIG. 1 is a schematic side view of a mechanical dock leveler illustrating the essential components of this invention in the horizontal level position.
Figure 2:
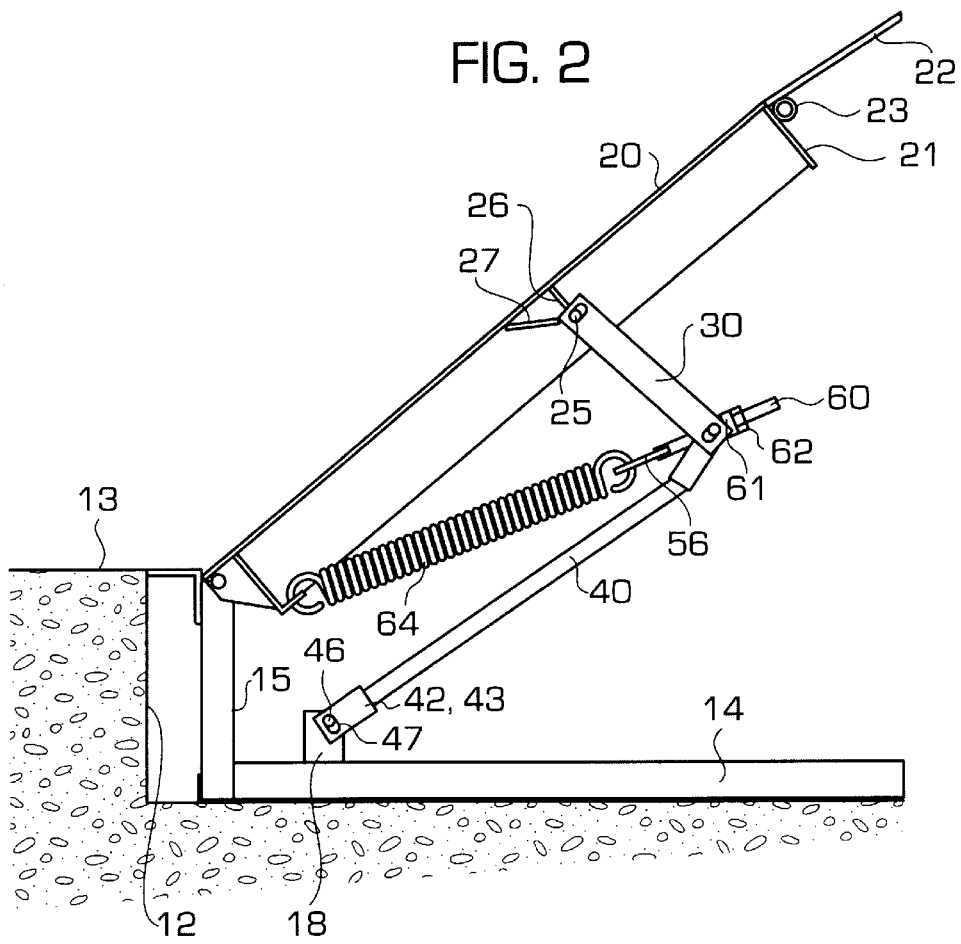
FIG. 2 is a schematic side view of a mechanical dock leveler of this invention with the deck in an elevated above dock position.
Figure 3:
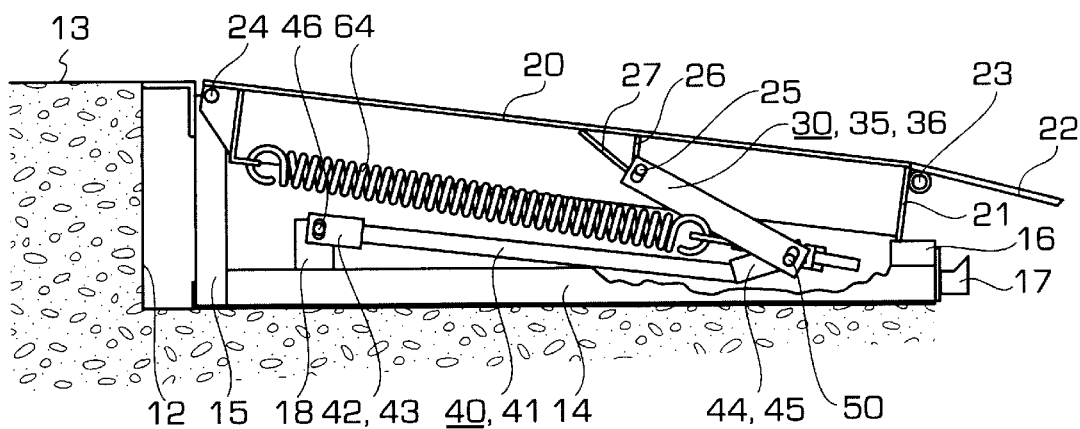
FIG. 3 is a schematic side view of a mechanical dock leveler of this invention in the lowered below dock position.

Referring now to FIGS. 1–3 the essential components of this invention will be described. The dock leveler 10 is typically mounted in a pit 12 below the surface 13 13 of the loading dock. A frame has horizontal members 14 and a vertical brace 15 both of which rest in the pit. The leveler frame also has ramp stops 16 and lip keepers 17 at the forward end of the horizontal members 14. The leveler 10 has a deck 20 and a plate 21 that forms a front header bar. The deck 20 is pivoted to the frame at pivot 24. A lip 22 is pivoted to the deck by hinge tube 23 attached to the front header bar 21. As illustrated in FIG. 1 the leveler is held horizontal in the stored position by the lip 22 resting in the lip keepers 17. As illustrated in FIG. 3 the leveler is limited in downward travel by the header bar 21 resting on the ramp stops 16. A hold down device and safety legs are typically present on a mechanical dock leveler but are not illustrated. The use of a hold down and safety legs are well known and need not be defined in greater detail. Reference is made to U.S. Pat. Nos. 4,847,935 and 4,974,276 for such devices.

Figure 4:
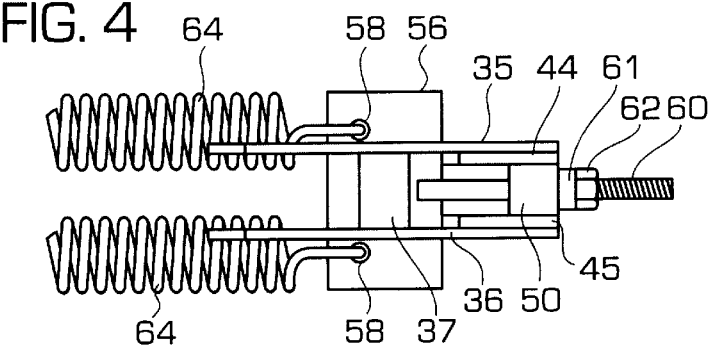
FIG. 4 is a top view of a portion of the linkage mechanism at the intersection of the links.

In accordance with this invention an upper link 30 is pivoted at one end to the deck and a lower link 40 is pivoted at one end to the dock leveler frame. Referring now specifically to FIGS. 4 through 7 the coupling between the upper and lower links will be described. The two links 30 and 40 pivot independently about a common pivot point using a pivot pin 50. As illustrated in FIG. 4, the upper link comprises a pair of members 35 and 36 joined together with a cross member 37. The lower link 40 comprises a strut member 41 having a pair of members 42 and 43 at one end and a pair of members 44 and 45 at the other end. The members 44 and 45 of the lower link fit within the members 35 and 36 and pivot about pin 50. As illustrated in FIG. 3, the lower link 40 is longer than the upper link 30 and the members 44 and 45 are set at an angle to the strut member 41 in the vicinity of the end pivoting on the pin 50. This is done to provide sufficient space for the springs 64.

Figure 5:
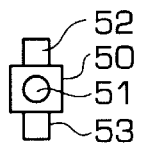
FIG. 5 is a front view of the pivot pin at the intersection of the links.

As illustrated in FIG. 5, the pivot 50 pin has a central portion with a hole 51 through it, and two smaller diameter pins 52 and 53 extending from the central portion. The upper and lower links are coupled to each other and to the pivot 50 by the two pins 52 and 53.

Figure 7:
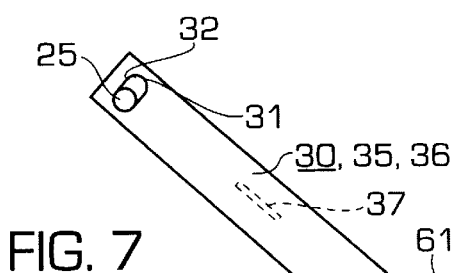
FIG. 7 is an enlarged side view of a portion of the linkage mechanism at the intersection of the links with the dock leveler in the elevated above dock position.
Figure 6:
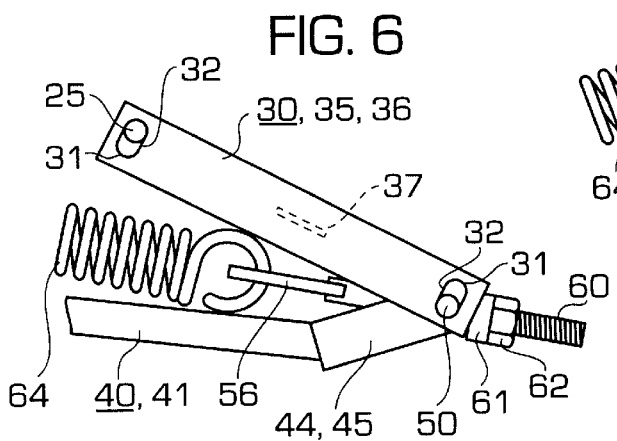
FIG. 6 is an enlarged side view illustrating a portion of the linkage mechanism at the intersection of the links with the dock leveler in the lowered below dock position.

The pivoting connection for the upper link 30 uses a pivot pin 25 attached to the deck by support brackets 26 and 27. The upper link members 35 and 36 have elongated holes 31 at each end with a surface 32 of sufficient length to roll on the pins 25 and 50 through the extent of the angular motion required. Thus rolling contact occurs between the pins 25 and 50, and the surface 32 of the holes 31, as illustrated in FIGS. 6 and 7. Similarly the lower link 40 is attached to the frame via a pin 46 through the bracket 18 and elongated holes 47 in the link members 42 and 43. Rolling contact also occurs at this pivot point. FIGS. 6 and 7 illustrate the motion of the pivot pins relative to the elongated holes in link 30 as the link members rotate from the lowest dock leveler position in FIGS. 3 and 6 to the highest position in FIGS. 2 and 7.

The mechanism will work with conventional pivot pins coupling the links to the deck and the frame but such pins have sliding movement between the surface of the pin and that of the hole. The rolling contact used here reduces friction at the linkage pivots. This in turn reduces the force required to walk down the deck. The members 44 and 45 have round holes rather than elongated holes to provide stability for the pin 50. Although there is pivoting motion between the members 44 and 45 and the pin 50, the relative angular motion is small and thus the frictional losses are small.

As illustrated in FIG. 4, a mounting bar 56 has a plurality of holes 58. It is attached to the pivot 50 via an adjustment bolt 60. The mounting of the bolt 60 to the pivot pin is accomplished using a thrust bushing 61 and a nut 62 is threaded on the bolt 60 and bears against the bushing 61. A plurality of tension springs 64 are attached to the deck 20 and to the mounting bar 56. By adjustment of the bolt 60 the tension of the springs 64 can be varied. For example if the bolt is moved to the right in FIG. 1, the mounting bar 56 will also be shifted thereby tensioning the springs 64. This arrangement provides a single point of adjustment for the for the counterbalance mechanism.

The operation of the device will now be explained. The dock leveler is stored as illustrated in FIG. 1 with the deck 20 in the horizontal position and the lip 22 pendent. In the case of a mechanical pit type leveler this is the stored cross traffic position. The deck is held in position by a hold down mechanism, conventionally used and not illustrated. The links 30 and 40 are at acute angle and the spring 64 is tensioned. When the hold down is released the deck pivots upward based on the force of the springs 64. The links support the deck in the elevated position. The lip 22 extends using a conventional mechanism responsive to upward motion of the deck. Because the counterbalance force of the linkage and the springs is set to be slightly greater than the force based on the weight of the deck tending to cause it to drop, the deck will remain elevated until a worker walks on the deck 20 and his weight causes the deck to lower. The hold down mechanism will hold the deck at the position it comes to with the lip resting on the bed of a truck. A degree of float is provided by the springs of the counterbalance mechanism and the hold down so that as the truck is loaded and unloaded the lip will remain in contact with the truck bed. When it is desired to store the leveler, the worker releases the hold down and allows the deck to raise and the lip to fall pendant. He then walks the deck 20 down until the lip keepers support the lip and hold the deck in the horizontal position illustrated in FIG. 1.

The tension of the springs 64 bias the lower link 40 which is coupled to the frame member 18, and the upper link 30 which is coupled to the deck 20, to rotate relative to each other. This provides counterbalance support for the deck 20 through the links. It will then be appreciated that the deck 20, links 30, 40 and the frame 16 form a four bar mechanism in compression via the tension of the springs 64. The selection of suitable proportions for the mechanism will ensure that the upward force on the deck 20 does not change in proportion to the change in spring tension as the deck raises and lowers. Thus the counterbalance force has less variation than the spring force as the leveler raises and lowers. The initial mounting points are not critical but must allow space for the springs. The lengths of the links are determined by equating the potential energy of the dock leveler to the stored energy of the springs. By this technique an optimum configuration can be determined as a function of the basic dock leveler configuration.

Below dock operations are illustrated in FIG. 3. In this situation, the ramp stops 16 are employed to limit downward movement of the deck. As illustrated, the link members 30 and 40 are in an acute angle relationship and the springs 64 tensioned to the maximum extent so that the spring force is high. However, because of the linkage mechanism's variable geometry the upward force on the deck does not increase.

It is apparent that modifications of this invention may be practiced without departing from the scope thereof. For example other techniques may be employed to tension the spring members. This includes slidable pistons, turnbuckles and ratchet devices.

I claim:

1. A dock leveler comprising: a frame mounted to a dock surface, a deck pivotally mounted to said frame, said deck movable between a stored generally horizontally position and an inclined position, a counterbalance mechanism including a first link pivotally secured to said deck and a second link pivotally secured to said frame, ends of said first and second links joined for relative pivoting movement at a common pivot point, a spring coupled at one end to said deck and at another end operably coupled to said common pivot point, said deck having a pin for attachment of said first link and said first link having a mounting hole sized to have width greater than the diameter of the pin, whereby rolling contact occurs between said pin and a surface of said hole said first link pivots, and said frame having a pin for attachment of said second link and said second link having a mounting hole sized to have a width greater than the diameter of the pin, whereby rolling contact occurs between said pin and a surface of said hole said second pin pivots.

2. The dock leveler of claim 1 further comprising means for adjusting the tension of said spring.

3. The dock leveler of claim 2 wherein said spring has said another end coupled to a mounting bar, said mounting bar having attached to it an adjustment bolt and a threaded nut at said common pivot point to vary the effective length of said adjustment bolt relative to said common pivot point.

4. The dock leveler of claim 1 wherein said spring comprises a plurality of tension springs each attached to said deck at one end and to said mounting bar at said another end.

5. The dock leveler of claim 1 wherein said first link comprises a pair of parallel arms and said second link is coupled to said pivot point between said parallel arms.

6. The dock leveler of claim 1 wherein said second link has a bend to facilitate clearance for said springs when said deck is in a below dock position.

7. The dock leveler of claim 1 wherein said second link is longer than said first link.

8. The dock leveler of claim 1 wherein said deck, said frame and said first and second links form a four bar linkage biased by said spring.

9. A dock leveler comprising a frame mounted in a pit at a dock, a deck having one end pivotally mounted to said frame, said deck movable between a stored generally horizontally position and an inclined position, a lip pivotally connected to another end of said deck, a counterbalance mechanism including a first link pivotally secured to said deck and a second link pivotally secured to said frame, ends of said first and second links joined for relative pivoting movement at a common pivot point, a spring coupled at one end to said deck and at another end operably coupled to said common pivot point, said deck having a pin for attachment of said first link and said first link having a mounting hole sized to have a width greater than the diameter of the pin, whereby rolling contact occurs between said pin and a surface of said hole said first link pivots, and said frame having a pin for attachment of said second link and said second link having a mounting hole sized to have a diameter greater than the diameter of the pin; whereby rolling contact occurs between said pin and a surface of said hole said second pin pivots.

10. The dock leveler of claim 9 further comprising means for adjusting the tension of said spring.

11. The dock leveler of claim 10 wherein said spring has said another end coupled to a mounting bar, said mounting bar having attached to it an adjustment bolt and a threaded nut at said common pivot point to vary the effective length of said adjustment bolt relative to said common pivot point.

12. The dock leveler of claim 9 wherein said spring comprises a plurality of tension springs each attached to said deck at one end and to said mounting bar at said another end.

13. The dock leveler of claim 9 wherein said first link comprises pair of parallel arms and said second link is coupled to said pivot point between said parallel arms.

14. The dock leveler of claim 9 wherein said second link has a bend to facilitate clearance for said springs when said deck is in a below dock position.

15. The dock leveler of claim 9 wherein said second link is longer than said first link.

16. The dock leveler of claim 9 wherein said deck, said frame and said first and second links form a four bar linkage biased by said spring.

\* \* \* \* \*